(12) United States Patent
Ziraknejad et al.

(10) Patent No.: US 11,500,655 B2
(45) Date of Patent: Nov. 15, 2022

(54) INLINE AND CONTEXTUAL DELIVERY OF DATABASE CONTENT

(71) Applicant: MicroStrategy Incorporated, Vienna, VA (US)

(72) Inventors: Siamak Ziraknejad, Reston, VA (US); Jiao Xu, Oakton, VA (US); Boyu Li, Herndon, VA (US); Quan Jia, Oakton, VA (US); Saurabh Abhyankar, McLean, VA (US); Raul de Leon, Vienna, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/247,892

(22) Filed: Jan. 15, 2019

(65) Prior Publication Data

US 2020/0065122 A1 Feb. 27, 2020

Related U.S. Application Data

(60) Provisional application No. 62/720,955, filed on Aug. 22, 2018.

(51) Int. Cl.
*G06F 3/04842* (2022.01)
*G06F 16/955* (2019.01)
(Continued)

(52) U.S. Cl.
CPC .......... *G06F 9/451* (2018.02); *G06F 3/04842* (2013.01); *G06F 16/248* (2019.01);
(Continued)

(58) Field of Classification Search
CPC .......... G06F 17/21; G06F 17/27; G06F 16/24; G06F 9/00; G06F 16/00; G06F 40/00;
(Continued)

(56) References Cited

U.S. PATENT DOCUMENTS

| 6,006,242 A | 12/1999 | Poole et al. |
| 6,209,005 B1 | 3/2001 | Harker et al. |
| 6,584,479 B2 | 6/2003 | Chang et al. |
| 7,630,965 B1 | 12/2009 | Erickson et al. |

(Continued)

FOREIGN PATENT DOCUMENTS

GB 2354851 4/2001

OTHER PUBLICATIONS

Constellationr.com [online], "MicroStrategy Embeds Analytics Into Any Web Interface" Feb. 12, 2019, retrieved on Jan. 15, 2020, retrieved from URL <https://www.constellationr.com/blog-news/microstrategy-embeds-analytics-any-web-interface>, 8 pages.

(Continued)

*Primary Examiner* — Jennifer N Welch
*Assistant Examiner* — Qi Wan
(74) *Attorney, Agent, or Firm* — Fish & Richardson P.C.

(57) ABSTRACT

Methods, systems, and apparatus, including computer programs stored on computer-readable media, for inline and contextual delivery of content, which may include content selectively determined using private database content. In some implementations, interface data indicating text of a user interface of a electronic device is obtained. A particular term in the text of the user interface of the electronic device is determined to satisfy one or more criteria. Based on determining that the particular term satisfies the one or more criteria, the particular term is annotated to alter the appearance of the particular term in the user interface. After annotating the particular term, user interaction with the annotated term is detected and a card is provided for display in the user interface. The card can include information that corresponds to the term and that was determined using content from a private database for an organization of the user.

20 Claims, 4 Drawing Sheets

(51) Int. Cl.

| | |
|---|---|
| *G06F 40/205* | (2020.01) |
| *G06F 9/451* | (2018.01) |
| *G06F 16/2457* | (2019.01) |
| *G06F 16/248* | (2019.01) |
| *G06F 40/295* | (2020.01) |
| *G06F 21/62* | (2013.01) |
| *H04L 67/60* | (2022.01) |
| *G06F 3/0481* | (2022.01) |
| *H04L 67/306* | (2022.01) |
| *H04L 67/01* | (2022.01) |

(52) U.S. Cl.
CPC .... *G06F 16/24575* (2019.01); *G06F 16/9558* (2019.01); *G06F 21/62* (2013.01); *G06F 40/205* (2020.01); *G06F 40/295* (2020.01); *H04L 67/32* (2013.01); *G06F 3/0481* (2013.01); *H04L 67/306* (2013.01); *H04L 67/42* (2013.01)

(58) Field of Classification Search
CPC ............ G06F 3/00; G06F 21/00; G06F 3/048; G10L 15/30; H04L 67/00
See application file for complete search history.

(56) References Cited

U.S. PATENT DOCUMENTS

| | | | |
|---|---|---|---|
| 7,673,282 | B2 | 3/2010 | Amaru et al. |
| 7,747,648 | B1 | 6/2010 | Kraft et al. |
| 7,827,527 | B1 | 11/2010 | Chiluvuri |
| 8,413,045 | B2 | 4/2013 | Lemonik et al. |
| 8,539,336 | B2 | 9/2013 | Griffiths et al. |
| 8,782,552 | B2 | 7/2014 | Batman et al. |
| 9,165,406 | B1 | 10/2015 | Gray et al. |
| 9,412,208 | B2 | 8/2016 | Greenberg et al. |
| 9,582,454 | B2 | 2/2017 | Greenberg et al. |
| 9,582,913 | B1 | 2/2017 | Kraft et al. |
| 9,710,123 | B1 | 7/2017 | Gray |
| 10,051,107 | B1 | 8/2018 | Prasad et al. |
| 10,318,995 | B2 | 6/2019 | King et al. |
| 10,503,821 | B2 | 12/2019 | Brunswig et al. |
| 10,554,590 | B2 | 2/2020 | Cabrera-Cordon et al. |
| 10,915,455 | B2 | 2/2021 | Jayaraman et al. |
| 11,003,323 | B1 | 4/2021 | Fan et al. |
| 11,120,057 | B1 | 9/2021 | McNabney et al. |
| 11,138,518 | B1 | 10/2021 | Yu et al. |
| 11,176,139 | B2 | 11/2021 | Li et al. |
| 11,238,210 | B2 | 2/2022 | Ziraknejad et al. |
| 11,288,637 | B2 | 3/2022 | Pena et al. |
| 2002/0160805 | A1* | 10/2002 | Laitinen ................. H04L 67/26 455/550.1 |
| 2004/0168171 | A1 | 8/2004 | Comparato et al. |
| 2004/0172616 | A1 | 9/2004 | Rothschiller et al. |
| 2004/0230447 | A1 | 11/2004 | Schwerin-Wenzel et al. |
| 2004/0249659 | A1 | 12/2004 | Schwerin-Wenzel et al. |
| 2006/0047646 | A1 | 3/2006 | Maluf et al. |
| 2006/0065707 | A1 | 3/2006 | Kanatani et al. |
| 2006/0293904 | A1 | 12/2006 | Ramanathan et al. |
| 2007/0040813 | A1 | 2/2007 | Kushler et al. |
| 2007/0157076 | A1 | 7/2007 | Lin et al. |
| 2007/0174350 | A1* | 7/2007 | Pell .......................... G06F 3/038 |
| 2007/0174761 | A1 | 7/2007 | Lin et al. |
| 2007/0180377 | A1 | 8/2007 | Gittelman et al. |
| 2007/0271376 | A1 | 11/2007 | Yach |
| 2007/0280179 | A1 | 12/2007 | Van Belle et al. |
| 2008/0005659 | A1 | 1/2008 | Fujimaki |
| 2008/0086455 | A1 | 4/2008 | Meisels et al. |
| 2008/0086700 | A1 | 4/2008 | Rodriguez et al. |
| 2008/0104052 | A1* | 5/2008 | Ryan ........................ G06Q 10/06 |
| 2008/0104501 | A1 | 5/2008 | Sattler et al. |
| 2008/0209329 | A1 | 8/2008 | DeFranco et al. |
| 2008/0243834 | A1* | 10/2008 | Rieman ................. G06F 3/0237 |
| 2008/0258881 | A1* | 10/2008 | Manson ................. H04L 67/02 340/286.14 |
| 2008/0294624 | A1 | 11/2008 | Kanigsberg et al. |
| 2009/0158200 | A1 | 6/2009 | Palahnuk et al. |
| 2009/0164564 | A1 | 6/2009 | Willis |
| 2009/0221268 | A1 | 9/2009 | Yach |
| 2010/0017478 | A1 | 1/2010 | Mejia et al. |
| 2010/0095240 | A1 | 4/2010 | Shiplacoff et al. |
| 2010/0138271 | A1 | 6/2010 | Henkin et al. |
| 2010/0174998 | A1 | 7/2010 | Lazarus et al. |
| 2010/0176194 | A1 | 7/2010 | Hodgkinson et al. |
| 2010/0228624 | A1 | 9/2010 | Morris et al. |
| 2010/0278453 | A1 | 11/2010 | King |
| 2011/0055250 | A1 | 3/2011 | Nandy et al. |
| 2011/0119165 | A1 | 5/2011 | Zee |
| 2011/0196851 | A1 | 8/2011 | Vadlamani et al. |
| 2011/0246880 | A1* | 10/2011 | Horton .................. G06F 3/0481 715/708 |
| 2012/0054211 | A1 | 3/2012 | Arsenault et al. |
| 2012/0131451 | A1 | 5/2012 | Abe |
| 2012/0144286 | A1 | 6/2012 | Bank et al. |
| 2012/0203753 | A1 | 8/2012 | Biran et al. |
| 2012/0212337 | A1 | 8/2012 | Montyne et al. |
| 2012/0233256 | A1 | 9/2012 | Shaham et al. |
| 2012/0254369 | A1 | 10/2012 | Gillard et al. |
| 2012/0265779 | A1 | 10/2012 | Hsu et al. |
| 2012/0278164 | A1 | 11/2012 | Spivack |
| 2012/0278305 | A1 | 11/2012 | Wei et al. |
| 2013/0031453 | A1 | 1/2013 | Griffiths et al. |
| 2013/0031454 | A1 | 1/2013 | Griffiths et al. |
| 2013/0031457 | A1* | 1/2013 | Griffiths ................ G06F 17/241 715/231 |
| 2013/0046544 | A1 | 2/2013 | Kay et al. |
| 2013/0054617 | A1* | 2/2013 | Colman ................. G06F 16/958 707/748 |
| 2013/0117653 | A1 | 5/2013 | Sukhanov et al. |
| 2013/0159848 | A1* | 6/2013 | Banke ................. G06F 17/2735 715/259 |
| 2013/0179209 | A1 | 7/2013 | Milosevich |
| 2013/0275120 | A1 | 10/2013 | DeGross |
| 2013/0283194 | A1 | 10/2013 | Kopp et al. |
| 2013/0325839 | A1 | 12/2013 | Goddard et al. |
| 2013/0332962 | A1 | 12/2013 | Moritz et al. |
| 2013/0344468 | A1 | 12/2013 | Lindsay et al. |
| 2014/0046976 | A1 | 2/2014 | Zhang et al. |
| 2014/0115070 | A1 | 4/2014 | Virtanen et al. |
| 2014/0115456 | A1 | 4/2014 | White et al. |
| 2014/0122289 | A1 | 5/2014 | Beck |
| 2014/0149896 | A1 | 5/2014 | Los et al. |
| 2014/0172418 | A1* | 6/2014 | Puppin ................. G06F 17/2735 704/10 |
| 2014/0173501 | A1 | 6/2014 | Wu |
| 2014/0177819 | A1 | 6/2014 | Vymenets et al. |
| 2014/0218385 | A1 | 8/2014 | Carmi |
| 2014/0229462 | A1 | 8/2014 | Lo |
| 2014/0236978 | A1 | 8/2014 | King et al. |
| 2014/0278349 | A1* | 9/2014 | Grieves ................ G06F 17/2735 704/8 |
| 2014/0304103 | A1 | 10/2014 | Barton et al. |
| 2014/0334721 | A1 | 11/2014 | Cervin et al. |
| 2014/0365395 | A1 | 12/2014 | Arguelles et al. |
| 2014/0365944 | A1 | 12/2014 | Moore et al. |
| 2015/0012279 | A1 | 1/2015 | Kim et al. |
| 2015/0019221 | A1* | 1/2015 | Lee ........................ G10L 15/08 704/246 |
| 2015/0074138 | A1 | 3/2015 | Nam et al. |
| 2015/0082219 | A1 | 3/2015 | Beck et al. |
| 2015/0160806 | A1 | 6/2015 | Fey et al. |
| 2015/0180875 | A1 | 6/2015 | Kay |
| 2015/0189347 | A1 | 7/2015 | Oztaskent et al. |
| 2015/0213074 | A1 | 7/2015 | Varakin et al. |
| 2015/0356085 | A1 | 12/2015 | Panda et al. |
| 2016/0044132 | A1 | 2/2016 | Croft |
| 2016/0048698 | A1 | 2/2016 | Sahu et al. |
| 2016/0070686 | A1 | 3/2016 | Yu et al. |
| 2016/0103883 | A1 | 4/2016 | Ramani et al. |
| 2016/0117593 | A1 | 4/2016 | London |
| 2016/0117782 | A1 | 4/2016 | Stibel et al. |
| 2016/0124924 | A1 | 5/2016 | Kharbanda et al. |
| 2016/0124928 | A1 | 5/2016 | Fink et al. |

(56) References Cited

U.S. PATENT DOCUMENTS

| | | | |
|---|---|---|---|
| 2016/0170981 A1* | 6/2016 | Morimoto | G06F 16/93 707/769 |
| 2016/0294755 A1 | 10/2016 | Prabhu | |
| 2016/0352891 A1 | 12/2016 | Niu et al. | |
| 2016/0379117 A1 | 12/2016 | Faaborg | |
| 2017/0097926 A1 | 4/2017 | Ben-Tzur | |
| 2017/0109334 A1 | 4/2017 | Anglin et al. | |
| 2017/0178144 A1 | 6/2017 | Follet et al. | |
| 2017/0188213 A1 | 6/2017 | Nirantar et al. | |
| 2017/0243132 A1 | 8/2017 | Sainani et al. | |
| 2017/0308291 A1 | 10/2017 | Luipold | |
| 2017/0315711 A1 | 11/2017 | Adams | |
| 2017/0329466 A1 | 11/2017 | Krenkler et al. | |
| 2017/0330195 A1 | 11/2017 | Lange et al. | |
| 2017/0366579 A1 | 12/2017 | Aguiar et al. | |
| 2018/0020076 A1 | 1/2018 | Porwal | |
| 2018/0060302 A1 | 3/2018 | Liang et al. | |
| 2018/0092547 A1* | 4/2018 | Tzvieli | G06F 3/012 |
| 2018/0113865 A1 | 4/2018 | Najork et al. | |
| 2018/0129941 A1 | 5/2018 | Gustafson et al. | |
| 2018/0190274 A1 | 7/2018 | Kirazci et al. | |
| 2018/0218042 A1 | 8/2018 | Krishnan et al. | |
| 2018/0225341 A1 | 8/2018 | Merg et al. | |
| 2018/0329878 A1 | 11/2018 | Hirzel et al. | |
| 2018/0337967 A1 | 11/2018 | Ritchie et al. | |
| 2018/0350144 A1 | 12/2018 | Rathod | |
| 2019/0035403 A1* | 1/2019 | Ramasamy | G10L 15/30 |
| 2019/0042601 A1 | 2/2019 | Ashe | |
| 2019/0042988 A1 | 2/2019 | Brown et al. | |
| 2019/0057165 A1 | 2/2019 | Rosen et al. | |
| 2019/0073350 A1* | 3/2019 | Shiotani | G06F 3/1243 |
| 2019/0080416 A1 | 3/2019 | Smith et al. | |
| 2019/0130468 A1 | 5/2019 | Lerman et al. | |
| 2019/0164063 A1 | 5/2019 | Moura et al. | |
| 2019/0197916 A1* | 6/2019 | Park | H04L 67/22 |
| 2019/0236205 A1 | 8/2019 | Jia et al. | |
| 2020/0005117 A1 | 1/2020 | Yuan et al. | |
| 2020/0029113 A1 | 1/2020 | Dacus et al. | |
| 2020/0065307 A1 | 2/2020 | Roy et al. | |
| 2020/0065342 A1 | 2/2020 | Panuganty | |
| 2020/0126540 A1 | 4/2020 | Panchamgam et al. | |
| 2020/0143102 A1 | 5/2020 | Ziraknejad et al. | |
| 2020/0160612 A1 | 5/2020 | Bowen | |
| 2020/0192965 A1 | 6/2020 | Imtiaz et al. | |
| 2020/0251111 A1 | 8/2020 | Temkin et al. | |
| 2020/0327564 A1 | 10/2020 | Simard et al. | |
| 2020/0387550 A1 | 12/2020 | Cappetta et al. | |
| 2020/0389317 A1 | 12/2020 | Dunjic et al. | |
| 2020/0395001 A1 | 12/2020 | Mohanty et al. | |
| 2020/0395016 A1 | 12/2020 | Kapila et al. | |
| 2020/0401580 A1 | 12/2020 | Fitzpatrick et al. | |
| 2020/0401593 A1 | 12/2020 | Panuganty et al. | |
| 2021/0081902 A1 | 3/2021 | Pena et al. | |
| 2021/0084032 A1 | 3/2021 | Ding et al. | |
| 2021/0133269 A1 | 5/2021 | Shah et al. | |
| 2021/0141794 A1 | 5/2021 | Picorel et al. | |
| 2021/0142763 A1 | 5/2021 | Notani et al. | |
| 2021/0149906 A1 | 5/2021 | Li et al. | |
| 2021/0201916 A1 | 7/2021 | Touret et al. | |
| 2021/0224345 A1 | 7/2021 | Shah et al. | |
| 2021/0240759 A1 | 8/2021 | Hwang et al. | |
| 2021/0240773 A1 | 8/2021 | Chen et al. | |
| 2021/0248135 A1 | 8/2021 | Rigney et al. | |
| 2021/0263916 A1 | 8/2021 | Niu et al. | |
| 2021/0271727 A1 | 9/2021 | Fan et al. | |
| 2021/0278938 A1 | 9/2021 | Fan et al. | |
| 2021/0342338 A1 | 11/2021 | Nocedal et al. | |
| 2021/0357378 A1 | 11/2021 | Urdiales et al. | |

OTHER PUBLICATIONS

Css-tricks.com [online], "Extracting Text from Content Using HTML Slot, HTML Template and Shadow DOM," Mar. 6, 2019, retrieved on Jan. 15, 2020, retrieved from URL <https://css-tricks.com/extracting-text-from-content-using-html-slot-html-template-and-shadow-dom/>, 6 pages.

Developer.mozilla.org [online], "High-level view," Jan. 29, 2018, retrieved on Jan. 15, 2020, retrieved from URL < https://wiki.developer.mozilla.org/en-US/docs/Web/Web_Components/Using_shadow_DOM$revision/1352031>, 6 pages.

Forbes.com [online], "These Ex-Israeli Surveillance Agents Hijack Your Browser to Profit From Ads," Jun. 9, 2015, retrieved on Jan. 15, 2020, retrieved from URL <https://www.forbes.com/sites/thomasbrewster/2015/06/09/from-israel-unit-8200-to-ad-men/#3ff26d7926e2>, 11 pages.

Github.com [online], "Non-invasive way of making highlights—maybe with an overlay? #291," Nov. 30, 2013, retrieved on Jan. 15, 2020, retrieved from URL <https://github.com/openannotation/annotator/issues/291>, 19 pages.

Github.com [online], "Textus," Oct. 27, 2012, retrieved on Jan. 15, 2020, retrieved from URL <https://github.com/okfn/textus>.

Glazkov.com [online], "What the Heck is Shadow DOM?," Jan. 14, 2011, retrieved on Jan. 15, 2020, retrieved from URL <https://glazkov.com/2011/01/14/what-the-heck-is-shadow-dom/>, 43 pages.

Medium.com [online], "Steps to Understanding the Shadow DOM," Feb. 22, 2019, retrieved on Jan. 15, 2020, retrieved from URL <https://medium.com/quick-code/understanding-the-shadow-dom-20e691cc611b>, 22 pages.

Microstrategy.com [online], "HyperIntelligence", available on or before Jan. 15, 2019, retrieved on Jan. 15, 2020, retrieved from URL <https://www.microstrategy.com/us/product/hyperintelligence>, 3 pages.

Nicolasleroy.fr [online], "TheFind launches price comparison service", Nov. 19, 2009, retrieved on May 14, 2012, retrieved from URL <http://www.nicolasleroy.fr/wp/2009/11/thefind-launches-price-comparison-service/ >, 6 pages.

Robdodson.me [online], "Shadow DOM: JavaScript," Sep. 2, 2013, retrieved Jan. 15, 2020, retrieved from URL <https://robdodson.me/shadow-dom-javascript'>, 11 pages.

Solutionsreview.com [online], "MicroStrategy 2019 Features New HyperCards and Federated Analytics," Jan. 7, 2019, retrieved on Jan. 15, 2020, retrieved from URL <https://solutionsreview.com/business-intelligence/microstrategy-2019-features-new-hypercards-and-federated-analytics/>, 4 pages.

Solutionsreview.com [online], "MicroStrategy Extends HyperIntelligence with New Platform Update," Jul. 1, 2019, retrieved on Jan. 15, 2020, retrieved from URL <https://solutionsreview.com/business-intelligence/microstrategy-extends-hyperintelligence-with-new-platform-update/>, 4 pages.

Vibrantmedia.com [online], "FAQs: Vibrant In-Text Advertising," retrieved on Mar. 31, 2011, retrieved from URL <http://www.vibrantmedia.com/in-text_advertising/faq.asp>, 2 pages.

Vibrantmedia.com [online], "In-Text Demo," retrieved on Mar. 31, 2011, retrieved from URL <http://www.vibrantmedia.com/in-text_advertising/demo.asp>, 2 pages.

Wikipedia.com [online], "In-text advertising", Mar. 2017, retrieved on Jan. 15, 2020, retrieved from URL <https://en.wikipedia.org/w/index.php?title=In-text_advertising&oldid=770109369>, 2 pages.

Wikipedia.com [online], "Web Components," Dec. 2017, retrieved on Jan. 15, 2020, retrieved from URL <https://en.wikipedia.org/w/index.php?title=Web_Components&oldid=815726999>, 5 pages.

"Screenshots Showing Example of Grammarly Web Browser Extension", Aug. 19, 2019, 2 pages.

community.microstrategy.com [online] "Amazon's Alexa: Key Analytics Applications That Deliver Voice-activated Reporting," May 2017, retrieved on May 21, 2020, retrieved from URL < https://community.microstrategy.com/s/article/Amazon-s-Alexa-Key-Analytics-Applications-That-Deliver-Voice-activated-Reporting?language=en_US>, 4 pages.

community.microstrategy.com [online], "How to Implement Voice-controlled Data Analytics With Amazon's Alexa", May 2017, retrieved on May 21, 2020, retrieved from URL <https://community.microstrategy.com/s/article/How-to-Implement-Voice-controlled-Data-Analytics-With-Amazon-s-Alexa?language=en_US>, 3 pages.

community.microstrategy.com [online], "HyperVoice and HyperVision," Feb. 2019, retrieved on May 21, 2020, retrieved from URL

(56) References Cited

OTHER PUBLICATIONS

<https://community.microstrategy.com/s/question/0D544000073QxyCCAS/hypervoice-and-hypervision?language=en_US>.

community.microstrategy.com [online], "What is MicroStrategy HyperIntelligence?," 2019, retrieved on May 21, 2020, retrieved from URL <https://community.microstrategy.com/s/article/KB442388-What-is-MicroStrategy-HyperIntelligence?language=en_US> 12 pages.

doughenschen.com [online], "MicroStrategy Embeds Analytics Into Any Web Interface" Feb. 2019, retrieved on May 21, 2020, retrieved from UR: <https://doughenschen.com/2019/02/10/microstrategy-embeds-analytics-into-any-web-interface/>, 6 pages.

eweek.com [online], "MicroStrategy Streamlines Analytics With 'Zero Clicks' UI," Jan. 2019, retrieved on May 21, 2020, retrieved from URL<https://www.eweek.com/enterprise-apps/microstrategy-streamlines-analytics-with-zero-clicks-ui.

idevnews.com [online], "MicroStrategy 2019 Brings AI/ML & Sematic Technologies to BI, Analytics," Feb. 2019, retrieved on May 21, 2020, retrieved from URL <https://www.idevnews.com/stories/7248/MicroStrategy-2019-Brings-AIML-Sematic-Technologics-to-BI-Analytics>, 3 pages.

Lippens, "Amazon's Alexa: Key Analytics Applications That Deliver VoiceActivated Reporting," May 2017, MicroStrategy, 23 pages.

Lippens, "Your Voice is Your Passport: Implementing Voice-driven Applications with Amazon Alexa," 2017, Microstrategy, 33 pages.

Lippens., "How to Implement Voice-controlled Data Analytics With Amazon's Alexa," May 2017, Microstrategy, 4 pages.

microstrategy.com [online], "7 Trending Technology Sessions You Won't Want to Miss at MicroStrategy World 2019," Dec. 2018, retrieved on May 21, 2020, retrieved from URL <https://www.microstrategy.com/us/resources/blog/bi-trends/seven-trending-technology-sessions-at-microstrateg>, 10 pages.

microstrategy.com [online], "Microstrategy 2019, The Platform for the Intelligent Enterprise" May 2019, retrieved on May 22, 2020, retrieved from URL <https://www.microstrategy.com/getmedia/4b9fbd76-952b-4da5-8f8d-489278abd59c/MicroStrategy-2019-whitepaper>, 14 pages.

microstrategy.com [online]. "Build and Deploy HyperCards Using Workstation," Feb. 2019, retrieved on May 21, 2020, retrieved from URL <https://www.microstrategy.com/getmedia/8103f59b-3416-4a33-bd6a-2e99c9afd474/Build-and-Deploy-HyperCards-Using-Workstation>, 30 pages.

microstrategy.com, [online], "Whats New in Microstrategy 2019", 2019, retrieved on May 21, 2020, retrieved from URL <https://www.microstrategy.com/getmedia/de71bdb6-6d88-4e62-90d5-0e4a3cf94bb6/whats-new-in-microstrategy-2019>, 138 pages.

prnewswire.com "MicroStrategy 2019, the World's Most Advanced Analytics & Mobility Platform, Powers Decisions for Every Moment of the Day" Jan. 2019, retrieved on May 21, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html>.

zdnet.com [online], "MicroStrategy 2019 introduces "HyperIntelligence" contextual BI," Jan. 2019, retrieved on May 21, 2020, retrieved from URL <https://www.zdnet.com/article/microstrategy-2019-brings-introduces-hyperintelligence-contextual-bi/>, 6 pages.

U.S. Office Action in U.S. Appl. No. 16/730,417, dated Aug. 4, 2020, 22 pages.
U.S. Notice of Allowance in U.S. Appl. No. 16/788,530, dated Feb. 22, 2021, 12 pages.
U.S. Office Action in U.S. Appl. No. 16/248,659, dated Dec. 17, 2020, 5 pages.
U.S. Office Action in U.S. Appl. No. 16/248,659, dated Feb. 17, 2021, 14 pages.
U.S. Office Action in U.S. Appl. No. 16/730,417, dated Feb. 11, 2021, 19 pages.
U.S. Office Action in U.S. Appl. No. 16/788,530, dated Jun. 25, 2020, 21 pages.
U.S. Office Action in U.S. Appl. No. 16/248,659, dated Feb. 14, 2022, 19 pages.
U.S. Office Action in U.S. Appl. No. 16/783,998, dated Feb. 16, 2022, 35 pages.
U.S. Office Action in U.S. Appl. No. 16/723,413, dated Dec. 29, 2021 23 pages.
U.S. Notice of Allowance in U.S. Appl. No. 16/730,417, dated Sep. 23, 2021, 9 pages.
U.S. Office Action in U.S. Appl. No. 16/248,659, dated Jul. 16, 2021, 17 pages.
Notice of Allowance in U.S. Appl. No. 16/688,065, dated Sep. 30, 2021, 9 pages.
Notice of Allowance in U.S. Appl. No. 17/021,116, dated Jan. 20, 2022, 8 pages.
Notice of Allowance in U.S. Appl. No. 17/316,201, dated Jun. 2, 2022, 8 pages.
Office Action in U.S. Appl. No. 16/804,575, dated Feb. 15, 2022, 12 pages.
Office Action in U.S. Appl. No. 16/804,644, dated Apr. 22, 2021, 37 pages.
Office Action in U.S. Appl. No. 16/804,644, dated Mar. 17, 2022, 47 pages.
Office Action in U.S. Appl. No. 16/804,644, dated Oct. 28, 2021, 45 pages.
Office Action in U.S. Appl. No. 17/021,116, dated Sep. 8, 2021, 24 pages.
Office Action in U.S. Appl. No. 17/065,837, dated Feb. 11, 2022, 12 pages.
Office Action in U.S. Appl. No. 17/084,574, dated Jan. 13, 2022, 30 pages.
Office Action in U.S. Appl. No. 17/155,365, dated Mar. 28, 2022, 14 pages.
Office Action in U.S. Appl. No. 17/172,767, dated Jan. 6, 2022, 9 pages.
Office Action in U.S. Appl. No. 17/179,479, dated Apr. 8, 2022, 9 pages.
Office Action in U.S. Appl. No. 17/180,171, dated Apr. 27, 2022, 32 pages.
Office Action in U.S. Appl. No. 17/316,201, dated Feb. 15, 2022, 25 pages.
Office Action in U.S. Appl. No. 16/723,413, dated Jun. 21, 2022, 27 pages.
Notice of Allowance in U.S. Appl. No. 17/172,767, dated Jul. 5, 2022, 9 pages.
Office Action in U.S. Appl. No. 16/804,575, dated Jun. 24, 2022, 14 pages.

\* cited by examiner

INLINE AND CONTEXTUAL DELIVERY OF DATABASE CONTENT

CROSS-REFERENCE TO RELATED APPLICATION

This application claims the benefit of U.S. Provisional Patent Application No. 62/720,955 filed on Aug. 22, 2018, the entire contents of which is incorporated herein by reference.

BACKGROUND

The present specification relates to inline delivery of database content.

SUMMARY

In some implementations, a computing system can identify keywords in a user interface and dynamically retrieve and present relevant information inline with the user interface. For example, a client device can run a software agent, such as a web browser extension, that monitors a user interface for instances of certain keywords. When the keywords are present, the software agent annotates the keywords and makes them interactive in the user interface. If a user interacts with a keyword, for example, by placing a cursor over the keyword, the software agent causes an information card or information panel to be displayed, e.g., overlaying a portion of the original user interface or otherwise inserted into the user interface. In this manner, the user can easily access information that is contextually relevant to the user interface, without the need to open a new application or switch between interfaces. This technique also provides numerous other advantages, discussed below, such as allowing content to be efficiently integrated with third-party user interfaces that the content provider does not control.

The system allows for significant customizability. These keywords monitored by the software agent can be specific to a user or the user's organization. For example, when the user is an employee of a company, the keywords of interest can be extracted from a private database for the company. The keywords can additionally or alternatively be selected or filtered to terms applicable to the specific user, e.g., terms relevant to the user's role in the company. When one of the keywords is determined to be present in the user interface, the software agent communicates with a server system to obtain information related to the keyword. This information can include data retrieved from a private database that has information specific to an organization associated with the user. For example, if the keyword refers to a customer of a user's company, status information, statistics, contact information, and other information about the customer's account with the company can be provided from the company's private database.

The type of information provided, as well as the values shown for those information types, can be customized for the user and organization. For example, a sales representative and a product engineer at the same company may be shown different types of information for the same keyword, due to their different roles. Similarly, two users in a company with the same role might be shown different information for the same keyword, due to the users having different types of previous interactions with the system. In general, the system can use machine learning techniques to predictively select which information to show to a particular user at a particular time for a given keyword, and how to organize the information.

In many conventional systems, user interfaces have a predetermined structure or layout designed to accommodate the content displayed. To add a new frame or region of the interface, the structure of each user interface to be updated usually must be changed one by one. For example, to provide embedded content in a web page or web application, the user interface is often designed to include an iFrame or other element for the embedded content. Native applications also generally have pre-defined user interface layouts. This often makes it difficult to add or alter embedded content regions in user interfaces because the source code, HTML code, or other data defining each user interface needs to be individually changed. For example, it may be desirable to provide a new embedded content region in each of many different pages of a web site or web application, but doing so may require changes to each of the pages individually.

Embedding content is also challenging because the party desiring to embed the content may not control or have the ability to change the underlying user interface.

For example, one company may have content to be embedded in an application provided by a different company. The content provider would need to rely on the application provider to modify the structure of the application, one page at a time, in order to have the content embedded. For example, it is often difficult for a company to integrate content from its proprietary database into a user interface provided by a third party, e.g., an e-mail application, a word processing application, a spreadsheet application, etc., because the company generally cannot change the structure of the user interface provided by the third-party.

The challenge of embedding content in user interfaces is also significant since the embedded content may be needed only selectively. For example, it may be desirable to embed content on some pages but not others. Similarly, the embedded content may only be applicable for a page at certain times and not others. The need for the embedded content may vary over time, and may be dependent on factors such as the context provided by other content in the page, which may also vary over time. As a result of these factors and others, simply adjusting a general template for many pages cannot perform the fine-grained integration of embedded content, since the decisions whether to embed content and what content to embed is often a page-specific decision that changes over time.

The techniques discussed in this document address these challenges by allowing content to be presented inline with web pages and applications that the content provider does not control and cannot modify. Similarly, the system can be configured to provide content inline with other content that has not been created yet, such as web pages or web applications that are not yet available.

The techniques in this document also provide an efficient way for users to access information, such as analytics data, in a user interface. By allowing a user to call up an information card within existing user interface, the user no longer needs to switch applications and lose the context of the applications involved in the user's current task.

Traditionally, if a user is performing a task with an application and desires to look up information from an analytics platform or other database-backed platform, the user generally needs to switch applications or windows, log in, submit a query for the information desired, then wait for results to be returned. The delays, multiple steps required, and overall inconvenience often discourage users from looking up needed information.

By contrast, the techniques in the present application do not require the user to switch applications or interfaces, and contextually-relevant information is provided in the interface where the user needs the information. This provides needed information to just the right user, time, and user interface where the information is needed. Delays are minimal because the client device can request and receive contents of the information cards before the user indicates that the information should be displayed. The software agent on a client device can evaluate contents of the user interface, generate a query for a server system, and receive and format results for display so the information cards for each of multiple different terms are available for display before the user indicates the terms of interest. Also, the user can call up the information with a single action on the existing interface, such as a mouseover, click, or tap on an annotated term in the user interface.

Limited user interface space is conserved since the information card can be provided in the same window or area of the application the user is already using, with no need to switch between applications. Also, the information card is displayed and removed dynamically, so it is shown only when the user requests it. Unlike interfaces that include a dedicated, persistent area for content that may not be needed at most times, the present technique frees up more of the interface for use by an application.

The techniques discussed below also provide an efficient way to publish customized or private database content to users. The keywords or terms of interest to each organization can be set based on the private database contents for the organization. For example, each organization can have its own set of customers, employees, suppliers, product names, and so on reflected in its private database. Based on the database contents, terms have a semantic meaning that is specific to that organization, which the system uses to tailor the display of information for members of the organization.

In some implementations, the system provides an interface for an administrator to easily adjust the sets of terms that the system will highlight and make interactive for members of the organization by updating the database or identifying certain portions of a dataset. For example, an administrator can identify columns of a private database corresponding to employee names, customer names, and product names. The system extracts the contents of these columns and designates them as key terms for the organization. The current set of these terms can be downloaded to client devices of members of the organization when they authenticate to the software agents on the client devices, so each time the user authenticates the set of terms is refreshed at the client device based on the current state of the database. The information displayed in the information cards is also generated using the current records of the database. Thus, by designating certain records or fields from an organization's database, an administrator can adjust or update the set of content published to some or all members of the organization, which will be made available through many user interfaces (e.g., presented in-line with any web page or web application).

When a client device indicates that one of the key terms for the organization is present, the server system can access the underlying database record(s) corresponding to the term to generate relevant information to provide. The semantic meaning of the term that is applicable for the user and organization is used to provide customized results. For example, different types of information are provided based on the classification of the term, e.g., whether a term is the name of an employee, customer, or product. Different semantic classifications can have different data types or sets of information to be provided. Even for a particular classification, of the many potential types of data that may be provided, a subset can be selected based on analysis of the database contents (e.g., to identify trends or items that are popular, recent, or unusual according to various thresholds), relevance to the user (e.g., applicability to the user's historical behavior or role in the organization), and/or context (e.g., other keywords in the user interface, which may indicate geographical location, time, individuals, or other information relevant to the user's current task). In this process, the organizations security policies are preserved. If a user does not have authorization to access a field or record from the database, the server system will enforce access restrictions and will not provide the information. Consequently, different users even within the same organization may be presented different sets of information for the same term, due to the users' differing roles, interaction histories, access authorizations, and other factors.

In one general aspect, a method performed by one or more computers includes: obtaining, by the one or more computers, interface data indicating text of a user interface of an electronic device, wherein the electronic device is associated with a user that is part of an organization; determining, by the one or more computers, that a particular term in the text of the user interface of the electronic device satisfies one or more criteria; based on determining that the particular term satisfies the one or more criteria, annotating, by the one or more computers, the particular term to alter the appearance of the particular term in the user interface; after annotating the particular term, detecting, by the one or more computers, user interaction with the annotated term; and in response to detecting the user interaction with the annotated term, providing, by the one or more computers, a card for display in the user interface, the card comprising information corresponding to the term wherein the information is determined using content from a private database for the organization.

Implementations can include one or more of the following features. In some implementations, the method includes identifying a user associated with the electronic device; and downloading, to the electronic device, data indicating a set of terms determined based at least in part on the user or organization. Determining that the particular term in the text of the user interface of the electronic device satisfies one or more criteria comprises determining, by the electronic device, that the particular term is included in the set of terms downloaded to the electronic device.

In some implementations, the set of terms includes entity names extracted from the private database for the organization.

In some implementations, the set of terms includes terms identified from the private database for the organization and filtered based on an identity of the user or a role of the user in the organization.

In some implementations, annotating the particular term to alter the appearance of the particular term in the user interface comprises altering at least one of a font, size, style, spacing, underline, color, background, highlight, or bounding shape for the annotated term.

In some implementations, detecting user interaction with the annotated term comprises detecting at least one of a click, drag, mouseover, swipe, tap, hold gesture, or selection on the particular term.

In some implementations, the method includes: in response to detecting user interaction with the annotated term, generating, by the electronic device, a request that indicates the particular term; transmitting the request from the electronic device to the server system over a communication network; and receiving, from the server system over the communication network and, data provided by the server system in response to the request. The data is retrieved from or is generated using data retrieved from the private database for the organization; and providing the card for display in the user interface comprises providing, in the card, the data retrieved from or generated using data retrieved from the private database for the organization.

In some implementations, providing the card for display comprises causing the card to be displayed overlaying a portion of the user interface.

In some implementations, the user interface of the electronic device is a user interface of an application executing on the electronic device; and the obtaining, determining, detecting, annotating, and providing are performed using a software agent executing on the electronic device.

In some implementations, the application is a web browser, and wherein the software agent is a browser extension module for the web browser.

In some implementations, the particular term is a name of an entity, and wherein providing the card for display in the user interface comprises providing data indicating indicators related to the entity.

In some implementations, the entity has a first classification, and the types of indicators included correspond to a predetermined set of data types corresponding to the first classification.

Other embodiments of these and other aspects include systems, devices, and computer-readable media configured to cause the actions of the methods to be performed.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a diagram illustrating an example of a user interface showing an information card provided in response to user interaction.

Like reference numbers and designations in the various drawings indicate like elements.

DETAILED DESCRIPTION

Figure 1:
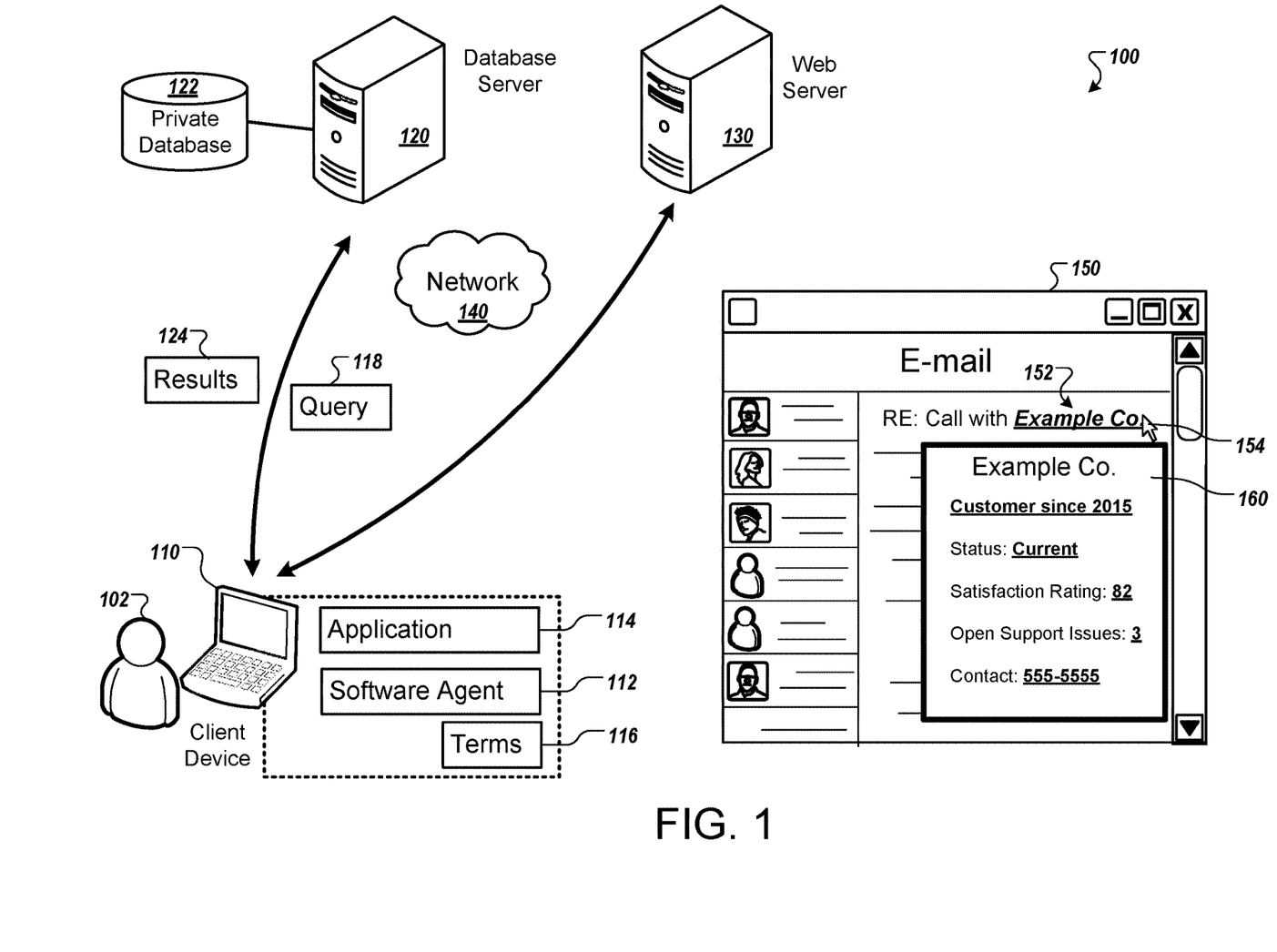
FIG. 1 is a diagram of an example of a system for inline delivery of database content.

FIG. 1 is a diagram of an example of a system 100 for inline delivery of database content. The system 100 includes a client device 110, a server 120, a web server 130, and a network 140. The server 120 has access to a private database 122 for an organization. The server 120 may be implemented using multiple computers that cooperate to perform the functions discussed below, and which may be located remotely from each other. The client device 110 includes an application 114 as well as a software agent 112 that enables the client device 110 to dynamically generate and display contextually-relevant information cards displayed inline with the application 114. As discussed below, the software agent 112 allows the client device 110 to obtain and provide information from the private database 122 with the application 114 and web page from the web server 130, even though the application 114 and web page are controlled by third parties.

The client device 110 is associated with a user 102, who is a member of an organization, e.g., an employee of a company. The private database 122 represents database records stored by or for the organization. The records are not publicly available and are subject to data access restrictions, such as requirements that users be issued credentials from the organization that grant authorization to access the records. Different users may be granted different levels of authorization, and the server 120 enforces access restrictions so that each user is only allowed to access the subsets of information the user is authorized to access.

Traditional analytics platforms generally incorporate analytics content into the body of a document, using an iFrame or similar technique. This approach can be inefficient, because each application or web page generally needs to be updated individually. Further, this type of embedding may not be possible when the content provider does not control the target application or web page for content to be embedded into. For example, an organization cannot change the standard e-mail application interface that a third party provides.

In the system 100, instead of incorporating additional content into the source of a document or application, information is instead added, just in time, through the software agent 112, for example, a browser extension for a web browser. This provides the flexibility for the system to selectively provide dynamically changing content from the private database for any interface shown on the application 114, e.g., any web application or web page displayed by a web browser.

In the example of FIG. 1, the client device 110 communicates with the web server 130 to obtain and display a page of a web site or web application in the application 114. The client device 110 generates a user interface 150 for the application 114. Concurrently, the software agent 112 runs on the client device 110 and receives, from the application 114, the text content of the rendered page, e.g., user interface 150.

The software agent 112 may require the user 102 to authenticate and thus prove authorization to receive content from the private database 122. The authentication of the user 102 can also indicate to the software agent 112 and/or server 120 the role of the user in the organization (e.g., software engineer, marketing technician, financial analyst, and so on) and the specific level of access authorization that has been granted to the user 102 by the organization.

With the user logged in, the software agent 112 accesses a set of terms 116, e.g., words and/or phrases, that are relevant to the user 102 and the organization. The set of terms stored at the client device 110. In some implementations, the set of terms 116 is requested and received from the server 120 each time the user 102 authenticates. The set of terms can represent values from certain fields of the private database 122, for example, values representing names of customers of the company of the user 102.

The software agent 112 compares the terms 116 with the text of the user interface 150 to identify matching terms. When the software agent 112 identifies one or more matches, it generates a query 118 that indicates the matches and sends the query 118 to the server 120. In some implementations, the software agent 112 also examines the text of the user interface 150 to identify and include in the query 118 other contextual factors that may be of interest (which may be different from the terms 116 of interest), such as terms indicating a time or a geographical location indicated in the user interface 150, or a task of the user 102 that may be indicated in the user interface 150. Various words and phrases indicating an overall subject or topic of the user interface 150 may also be extracted and provided in the query 118.

The server 120 processes the query 118 and generates results 124 using the contents of the private database 122. These results 124 can indicate, for each identified matching term, various indicators (e.g., attributes, statistics, visualizations, text, or other content) relevant to the term. In some instances, the indicators can represent key performance indicators for an entity referred to by an identified term with respect to the specific organization of the user 102. For example, when the term refers to a customer of a company of the user 102, one of the indicators may specify a product of the company that was purchased by the customer, current or forecasted sales of the company to the customer, etc.

The client device 110 receives the results 124 from the server 120. The software agent 112 annotates instances of the identified matching terms in the user interface and prepares the results 124 for display. For example, to annotate the matching terms, the software agent 112 may instruct the application 114 to highlight the term or otherwise change the formatting of the term (e.g., color, font, size, bold, italics, underlining, etc.) in the user interface 150. In some implementations, the results 124 are not immediately displayed. Rather, the software agent 112 causes the matching terms to become interactive, so that interaction of the user with a term triggers display of an information card for that term. In this manner, when a user indicates interest in one of the terms, e.g., by placing a mouse cursor over the term, the software agent 112 is notified of the interaction and causes an information card with the indicators relevant to the term to be displayed. The information card can be displayed overlaying a portion of the original user interface 150, for example, as a pop-up card near the instance of the term that the user interacted with. The software agent 112 also detects when the user 102 is no longer interested in the information card and automatically removes (e.g., closes or hides) the information card in response. For example, when the user moves the cursor away from the interactive term and away from the information card (or taps or clicks outside the interactive term and information card), the software agent 112 hides the information card.

In FIG. 1, the software agent 112 has determined that the user interface 150 includes a term 152 "Example Co.," which is one of the terms 116 relevant to the organization of the user 102. The software agent 112 has received results 124 that indicate indicators for this term 152, which represents a customer of the organization of the user 102. In response to identifying the matching term 152, and in some instances also receiving results 124 from the server 120 for the matching term 152, the software agent 112 makes the term 152 interactive and causes the term 152 to be annotated, in this case, displayed bold, underlined, and in italics. Initially, the software agent 112 does not cause any of the indicators for the term 152 to be displayed. However, when the user moves the cursor 154 over the term 152, the software agent 112 detects the interaction and displays an information card 160 showing various indicators provided by the server 120 in the results 124. When the user 102 is done reviewing the information card 160, the user 102 can move the cursor away or click away from the term 152 and information card 160, and the software agent 112 automatically hides the information card 160 until the user 102 again interacts with the term 152.

The software agent 112 can receive and examine the content of the user interface 150 of the application 114 on a recurring or ongoing basis. For example, as the user 102 navigates to a new web page or a new view of a web application, the software agent 112 examines the updated content of the user interface 150. The software agent 112 finds matches in the updated interface, requests and obtains new results for the updated interface, and causes new sets of terms to be annotated and made interactive, allowing the user 102 to access information cards for key terms for whatever interface content may be provided in the application 114. The software agent 112 can receive and analyze user interface content in substantially real time. For example, if the user 102 composes an e-mail message, the software agent can detect matching terms in text that the user types, in some instances while the user is still typing, and annotate matching terms in this content.

The system can provide very low latency for users to receive information regarding key terms in a user interface. Because the software agent 112 can identify terms and obtain terms automatically and in the background, in many instances the information needed for an information card 160 is already present at the client device 110 before the term is annotated. Consequently, when the user interacts with an annotated term, the corresponding information card 160 can be displayed very quickly, often within a second or less. This provides users a very fast response while also allowing access to the information from the private database 122 without having to leave the user interface 150 of the application 114.

Figure 2A:
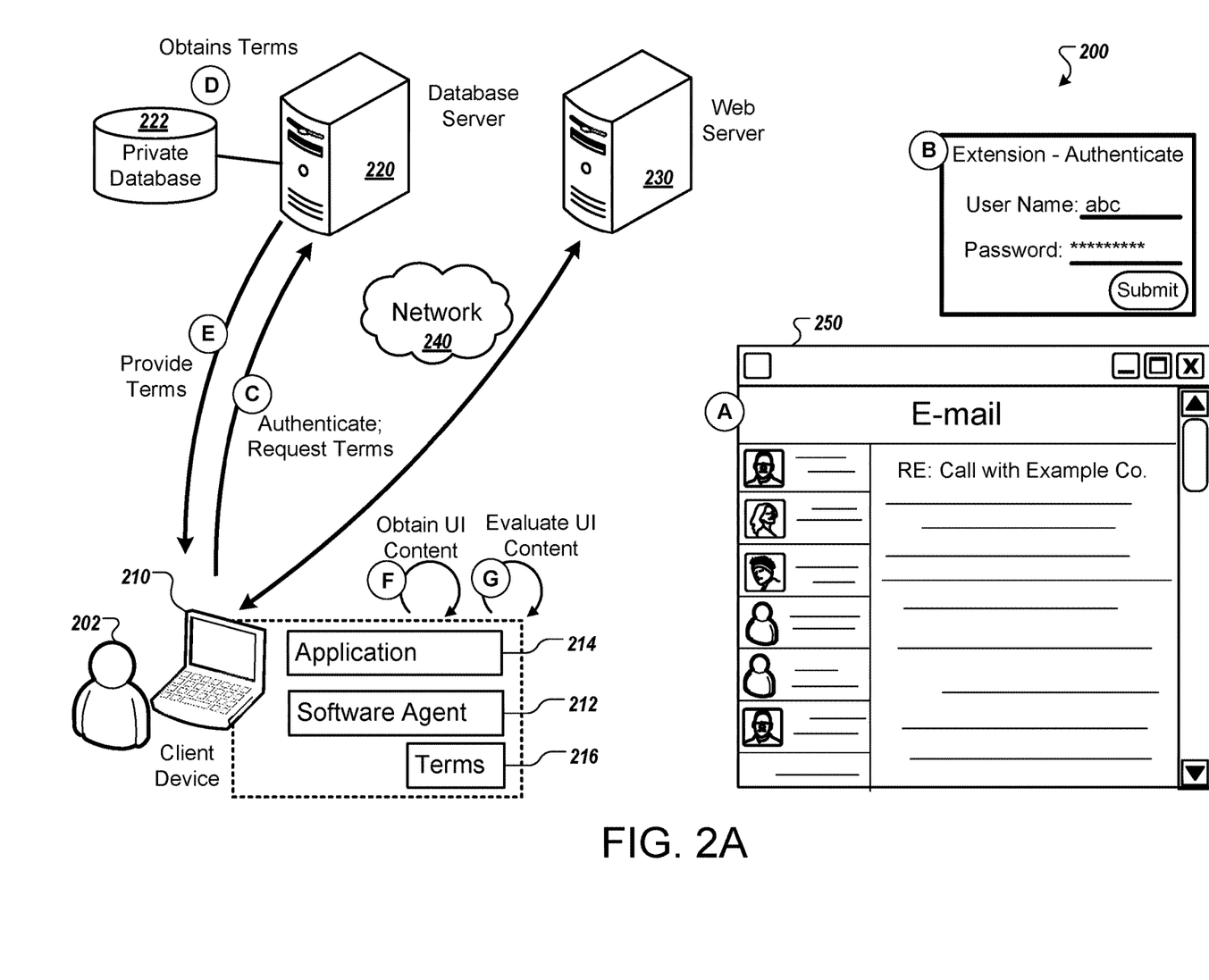
FIGS. 2A-2B are diagrams illustrating another example of a system for inline delivery of database content.
Figure 2B:
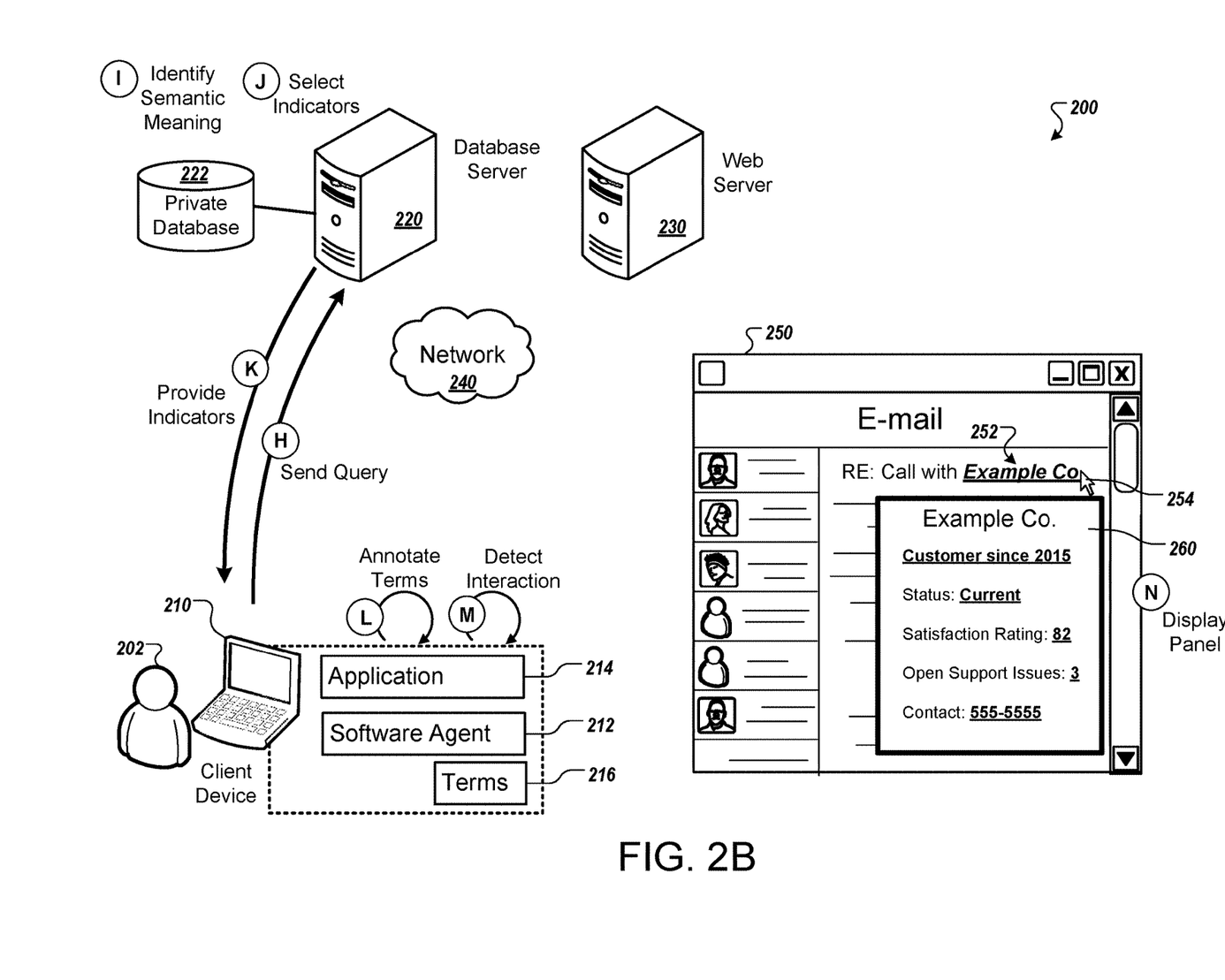

FIGS. 2A-2B are diagrams illustrating another example of a system 200 for inline delivery of database content. FIGS. 2A-2B illustrate various operations of the system 100 in greater detail. FIGS. 2A-2B illustrate various operations and flows of data represented as stages (A)-(N), which can be performed in the order shown or in a different order.

The system 200 includes a client device 210, a server 220, a web server 230, and a network 240. The server 220 has access to a private database 222 for an organization. The server 220 may be implemented using multiple computers that cooperate to perform the functions discussed below, and which may be located remotely from each other. The client device 210 includes an application 214 as well as a software agent 212 that enables the client device 210 to dynamically generate and display contextually-relevant information cards displayed inline with the application 214. As discussed below, the software agent 212 allows the client device 210 to obtain and provide information from the private database 222 with the application 214 and web page from the web server 230, even though the application 214 and web page are controlled by third parties.

In stage (A), the client device 210 obtains and displays content from the web server 230 in the user interface 250.

In stage (B), the user 202 authenticates to the software agent 212, e.g., a web browser extension or add-on for another type of application 114. For example, the software agent 212 may prompt the user 202 to log in, or the user may click an icon for the software agent 212 to initiate log in. The user can enter a username and password, or alternatively authenticate in another form, e.g., through biometric data entry, entry of a PIN code, etc.

In stage (C), the software agent 212 communicates with the server 220 to authenticate the user 202. The software agent 212 may optionally request updated information from the server 220, such as a set of terms 216 representing keywords relevant to the user 202 and an organization of the user 202.

In stage (D), the server 220 completes the authentication of the user 202. Once it is determined that the received credentials are valid and are authorize access to information from the private database 222, the server 220 obtains the current set of terms or keywords that are applicable for the user 202 and the user's organization. This can involve extracting information from the private database 222, for example, extracting values from certain columns or fields of the database, such as extracting values representing names of entities or objects. Terms may additionally or alternatively be extracted based on having certain metadata tags or data types associated with them. Other terms, such as abbreviations, nicknames, and other identifiers can also be included. The terms may be filtered based on the access permissions of the user 202, the role of the user 202 (e.g., department, job title, responsibilities, etc.), and other factors.

In stage (E), the server 220 provides the terms to the client device 110 for storage and for use by the software agent 212. These terms can be set by an administrator for the system 200. In some implementations, the set of terms is generated by the server, for example, by pulling terms from a portions of a database or other data source. For example, the server 220 may access database tables that list entity names (e.g., for competitors, suppliers, partner organization, employees, customer contacts, etc.) as well as abbreviations and/or nicknames for them. Based on the identity and role of the user 202, the server 220 may filter the list, e.g., limiting the extracted set of terms to those having information determined to be relevant to the role of the user 202 and also those for which the user 202 has security permissions to access corresponding data. The set of terms may be further limited to terms for types of entities for which appropriate information card templates have been defined. The filtered list of terms can then be provided to the client device 210. The database may be queried dynamically each time to obtain an up-to-date set of key terms each time a new set of terms 216 is requested.

In some implementations, the user 202 may be able to customize the set of terms that are annotated and made interactive to be able to trigger display of an information card. For example, the software agent 212 may provide a user interface allowing a user 202 to edit the list of terms, e.g., to add or remove terms from the set that will be identified and annotated in the future. These changes can be customized for the specific user identity of the user 202 who is logged in and/or for the specific client device 210 used. The user interface may allow edits for individual terms, or for groups or categories of terms. This ability can allow a user to limit the terms that will be annotated to the set that the user is specifically interested in. Similarly, it can expand the set of terms to include terms that may not be directly related to the user's role but still relate to the user's interests.

The terms 216 can be terms other than proper names. For example, for an engineer, the terms 216 may additionally or alternatively may include component types, product names, or technical terms. Corresponding information cards may indicate a variety of types of information. For a component, a card might provide specifications, indicate suppliers, provide links to datasheets, identify products that use the component, etc.

In stage (F), the software agent 212 obtains user interface content from the application 214. For example, the software application 212 obtains text content from the user interface 250. This can include the entire content of the rendered page, document, or view, not only the portion that may be currently visible on screen (e.g., due to the current scrolling position).

In stage (G), the software agent 212 evaluates content of the user interface. For example, this can include comparing text from the user interface 250 with the terms 216 provided by the server 220 and stored at the client device 210, to identify matching terms that should be annotated and for which information cards may be generated.

In some implementations, the software agent 212 and/or the database server 220 may analyze text of the user interface 250 to identify or generate indicators to be displayed. Through analysis of the text of the UI, the software agent 212 and/or the database server 220 can, in real-time, produce indicators and other information on the fly, without the indicators being previously designed by a human author or administrator. For example, if the software agent detects there are multiple instance of an attribute combined with time and geographical dimensions, through interactions with the server 220, the software agent can produce specific aggregations of data for the indicated time and geography and present the information in an information card. To carry out this function, the server 220 can access a semantic graph to enable interpretation of content as it relates to a business or other entity, provide a summary, and link to more details, all of which can be produced dynamically. The semantic graph can indicate, for example, the attributes of an entity and may indicate where to locate data for the attributes from the private database 222.

As an example, from text in a web page, the software agent 212 may identify words in various semantic categories. As an example, along with a keyword "Example Co.," the extension may identify the terms "Q2," "Florida," "subscribers," and "2016" which are not keywords corresponding to specific entities of interest, but nonetheless have a semantic meaning identified by the software agent 212. From these additional terms, the software agent may compose one or more indicators to be requested from the database server 220. For example, the software agent 212 may generate a query that requests a number of subscribers from Example Co. were added in Florida from April to June of 2016. Similarly, the software agent 212 may generate a query requesting a total number of subscribers from the company for the same period and location. In addition, or as an alternative, the software agent 212 may provide the terms with semantic meanings to the database server 220, and the database server 220 can identify appropriate indicators from the terms.

Referring to FIG. 2B, in stage (H), the software agent 212 generates a query that indicates which terms 216 were identified in the user interface 250. The query can additionally include other contextual information, such as indications of time, geographical location, or topic that the software agent 212 identified in the content from the user interface 250. The software agent 212 causes the client device 210 to send the query to the server 220.

In stage (I), the server 220 identifies a semantic meaning for each identified term that the query indicates. As part of identifying a semantic meaning, the server 220 may select a semantic classification from among multiple predetermined semantic categories. The semantic meaning is generated using the information of the private database 222 and so can be specific to the user 202 and the organization of the user. For example, one company may be a supplier for one organization and a customer of another. Similarly, even within one organization, an individual may be the supervisor of one user but a peer of or may be supervised by a different user. Thus, the interpretation of the terms can vary based on the relationships indicated in the private database 222 and can vary from one organization to another, from one user to another, and over the course of time.

In stage (J), the server 220 selects indicators for each identified match to the terms 216. The server 220 also looks up or calculates values for each type of indicator selected. These indicators or types of values to show may be any of multiple types of values. For example, some indicators may be attributes or database field values retrieved directly from a database or other data source. As another example, indicators may be results of aggregation of data from one or more databases, or may be results of processing data with equations, formulas, functions, or models.

The server 220 may select the indicators to be provided using one or more templates that specify which indicators to use in information cards corresponding to different types of entities. For example, a template specifying a first set of indicators may be used for entities classified as suppliers, while a template specifying a different set of indicators may be used for entities classified as customers. As another example, companies, people, locations, and products may each have different templates or sets of indicators predefined, since each may have different attributes or characteristics of interest. Both of these can be used together also. For example, a first set of the indicators may be determined based one classification of an entity (e.g., person, place, object, . . . ) while a second set of the indicators may be determined based on a different classification for the entity (e.g., supplier, customer, competitor, etc.) The templates may indicate formatting and layout for information cards as well as the types of indicators that should be provided.

As noted above, for each matching term, the server 220 determines a semantic classification of the term, e.g., a category or classification of the term and/or identifying an entity that the term refers to (e.g., where the entity may be a particular person, company, object, etc.). The server 220 also accesses one or more records from the private database 222. The types of records accessed may vary based on the semantic classification. For example, when the term is a customer name, the data may indicate indicating attributes of the customer (e.g., size, geographical presence, industry, etc.), financial records for the customer (e.g., products purchased, historical and predicted sales amounts, etc.), contact information for representatives of the customer, and so on. When the term is determined to refer to an employee, the accessed records may indicate the department of the employee, the responsibilities of the employee, the supervisor of the employee, the length of time the employee has been with the company, and so on.

For each semantic category, the server 220 can have a number of potential indicators or types of data that can be provided. These indicators can take any appropriate form, such as text, numbers, icons, charts, graphs, images, etc. In some instances, the indicators can represent key performance indicators for an entity referenced by an identified term with respect to the specific organization of the user 202. For each matching term identified in the user interface 250, the server 220 selects a subset of the available indicator or data types to provide in the results 224. This subset can be selected based on various factors. In some implementations, a predefined set of indicators is pre-associated with different semantic classifications. As a result, one set of indicators is provided for customers, another set of indicators is provided for employees, another set of indicators is provided for suppliers, and so on. One way that the server 220 can implement this is to have templates defined for each semantic classification, where the template indicates data types of indicators that are set to be provided for terms having that classification. Each indicator can have one or more references to data within the database, e.g., a column or field type of the private database 222 used to obtain or generate the indicator, as well as corresponding equations for generating the indicator and criteria such as threshold for evaluating the indicator.

In some implementations, at least some of the indicators are selected dynamically based on analysis of the contents of the private database 222. This process can be done to modify (e.g., filter and/or supplement) a base set of indicators pre-associated with a semantic classification or to generate the set of indicators directly. The indicators to be provided are selected from what is available or what can be calculated from the information in the private database 222 and optionally other data sources. From the available indicators, the server 220 can apply various thresholds to determine which indicators are most relevant. For example, if an indicator deviates from a historical average or range by more than a threshold amount, the indicator can be indicated selected. Similarly, if an indicator relates to a recent or upcoming event occurring within a threshold amount of time from the current time, the indicator can be selected. In general, each indicator can be assigned a score for each of multiple factors, the indicators can be ranked based on the scores, and the highest-scoring indicators can be selected to provide to the client device 210 in the results 224.

The indicators can also be customized based on the role of the user 202 in the organization. For example, the server 220 can look up a job title, department identifier, or other classification of the user 202, and also access data specifying indicators relevant to that classification. As an example, a user indicated in company records as a financial analyst may be provided financial metrics for a customer, while a user indicated as an engineer may be provided technical information about a product sold to the customer. The indicators selected can be further customized based on the historical interaction of the user 202. For example, based on records of interactions of the user 202 with prior information cards, the server 220 can determine which indicators are likely to be of interest to the user 202 for different types of entities.

The server 220 may use various other techniques to select indicators, including predefined indicators for specific classifications or specific entities, user interactions data for multiple users, user preferences of the user 202, prior behavior of the user 202, artificial intelligence or machine learning, analysis of trends, news and recent events, and so on.

In some implementations, the system tracks user interactions and learns from user behavior. For example, the system can monitor interactions with information cards and adapt the current information card or later-provided information cards in response. The system can track any of a variety of interaction parameters, such as how long an information card is displayed, how many times the information card is caused to be displayed, whether a user moves a cursor over a UI element (e.g., a mouseover), how long the cursor hovers over the UI element, whether a UI element is selected or copied to a clipboard, etc. Information cards can have interactive elements also, e.g., buttons, scrolling controls, drop-down lists, hyperlinks, sliders, dials, maps, embedded audio or video, and so on. These interactive elements may reveal additional indicators or allow a user to access additional content from the private database or other data sources. The system can track interactions with these interactive elements as well.

The system can customize the characteristics of information cards for users individually or based on aggregated information about interactions of multiple users. For example, according to the level of interaction that users have with indicators on the cards, the system can change which types of indicators are selected, as well as the prominence, arrangement, or number of indicators presented. If one user frequently hovers over, selects, or copies to a clipboard information from a certain type of indicator for entities of a certain classification, the system may generate future cards for that classification to show the indicator more prominently (e.g. larger or closer to the top of the card) and/or to include additional related indicators (e.g., showing the indicator with greater precision, or showing trends in the indicator over time, or showing other indicators of the same data type). As another example, if a user rarely interacts with certain types of indicators, those indicators may be made less prominent (e.g., smaller or lower in the card) or may be removed.

Tracking and adjustment of information cards can be done on a per-user basis, or for groups of users (e.g., users at similar roles or in the same department or organization), or across users generally. Similarly, tracking and adjustment can be done for certain classifications as a whole (e.g., across all entities or terms sharing a semantic classification), or tracking and adjustment may be done separately at the level of individual terms or entities. For example, two companies of the same semantic classification (e.g., both suppliers to an organization) may have different indicators shown in their information cards, or have a different arrangement of the indicators, due to different ways users interact with the respective cards.

The server 220 may apply security policies when selecting which types of indicators to use and when generating or providing values for the indicators to the client device 210. For example, security policies may limit access to certain databases or portions of databases, and the server 220 may determine whether the user 202 has sufficient access privileges before providing (or even simply retrieving or computing) values for that depend on data that the user 202 is not authorized to access. In some implementations, database information may secure information at the level of a table, column, and/or row. As a result, collections of records, individual records, or even individual fields or elements of records may have security policies applied. If the server 220 determines that the value of an indicator would depend on data that the user 202 is not authorized to access, the server 220 does not provide the indicator value. Instead, the server 220 may omit that indicator, substitute the indicator for one that the user 202 is authorized to obtain, or cause a placeholder value such as "n/a" or "---" to be provided to indicate that the value is not being provided.

In some implementations, the server 220 maintains associations or links between terms and different data records or data sources. For example, the server 220 may store data mapping terms to data cubes used for online analytical processing (OLAP). Selecting the types of indicators and determining the values for those indicators can involve using the mapping data to retrieve data from the data cubes (or other forms of data storage). Other mappings may also be used. For example, different terms may mapped to a unique identifier, which is then mapped to other records. For example, the terms "Example Company," "Example Co.," "EC," and other related terms may each map to a single entity identifier, which may then be used to retrieve information about the which indicators are relevant and what the values for those indicators should be.

In stage (K), the server 220 provides the values for the selected indicators for each identified term from the query to the client device 210. In the example, the selected indicators include a status of the "Example Co." company with respect to the organization of the user 202, a satisfaction rating indicating how satisfied the company appears to be as a client, a number of open support issues for "Example Co." and contact information for "Example Co." The server provides an indication of each of these indicator types, as well as a value corresponding to each indicator, e.g., a value of "current" for the status indicator, a value of "82" for the satisfaction rating indicator, a value of "3" for the number of support issues, and the phone number "555-5555" for the contact information indicator.

In stage (L), the software agent 212 cooperates with the application 214 to annotate the identified terms in the user interface 250. For example, the term 252 is annotated in FIG. 2B. This process causes the annotated terms to become interactive. For example, the software agent 212 can register with the application 214 to receive notification of interaction events, such as a mouseover event, click event, tap event, etc.

In some implementations, when the application 214 is a web browser, the software agent 212 can inject code, such as HTML code and/or JavaScript code, into the content of a web page being browsed to cause annotations to be shown. The injected code may also listen for and respond to events, such as a click, mouseover, tap, or other interaction with annotated terms. When the application 214 is not a web browser, the software agent 212 may use other techniques, such as macros or APIs to cause terms to be annotated and become interactive. In a similar manner that a web browser accepts toolbars and extension modules, the application 214 may provide extension components to integrate with other types of applications as well. More generally, the software agent may provide overlay content to be placed on, around, or over the place where the term occurs. This may optionally be done through communication with the operating system rather than integration with a specific application.

In stage (M), the software agent 212 detects interaction with one of the annotated terms. For example, the user 202 moves a cursor 254 over the annotated term 252. The software agent 212 may detect the interaction by being notified by code that was injected into a web page, such as event handling code that notifies the software agent 212 of the user action. Other techniques may additionally or alternatively be used. For example, the software agent 212 may monitor user input events generally, with information provided by the operating system, for example. The software agent 212 may track the on-screen position of each annotated term, as well as the position of a cursor or user input, and thus detect when the user has interacted with one of the annotated terms.

In stage (N), the software agent 212 causes the display of an information card 260, for example, as an overlay or pop-up over the original user interface 250. The information card can include the indicators selected by the server 220 and provided over the network. In some implementations, the information card 260 can be displayed near, e.g., adjacent to or even partially or completely overlapping the annotated term 252.

While various examples discuss annotating terms shown in a web page, the same techniques can be used to annotate and make interactive terms occurring anywhere in a user interface. Thus, terms in applications, documents, toolbars, controls, or any other part of a user interface can be annotated and made interactive to trigger display of an information card corresponding to the term.

As discussed above, the application can be a web browser, and the software agent can be a web browser extension. Nevertheless, the same techniques can be used to provide information cards for other types of applications and with other types of software agents. For example, a native application for word processing, spreadsheet editing, presentation editing, document viewing, etc. can provide an application programming interface (API) through which the content of the application can be provided to a software agent implemented as an application add-on module or extension. The software agent can integrate with or operate alongside a native application to identify keywords and dynamically display information cards as discussed herein.

FIG. 3 is a diagram illustrating an example of a user interface 300 showing an information card provided in response to user interaction. In the example, the user interface 300 is one that may be provided by a client device, such as devices 110, 210 above. The particular example illustrated shows a web browser and a web page providing information from a user's e-mail account. Upon navigating to the web page, the client device obtains the text content to be displayed, e.g., content of the web page, and checks the text content for matches with a set of key terms, e.g., words or phrases indicated by a server system or stored at the client device. As discussed above each of the key terms has corresponding information in a database. A key term may refer to a particular entity, and the entity can have a particular information card template associated with it.

In FIG. 3, after navigating to the web page shown in the user interface 300, the system has determined that the phrase "Global Corporation" is matches an entry in a list of key phrases. In response, the client device annotates each instance 310 of this term in the user interface 300, shown here by bold and italic formatting and a box around the term. Other types of annotations can be additionally or alternatively used. Each instance of the key term is also made interactive.

When the user interacts with an instance 310 of the key term, the client device generates and provides an information card 320 corresponding to an entity represented by the term. As illustrated, the interaction can be a mouse-over event where a cursor rests on or near the annotated term for at least a minimum amount of time. This interaction can trigger the client device to request an information card from a server system. The information card can include any of various types of information relating to the entity indicated by the key term, such as values from a database, statistics, visualizations, links to further information, quantitative or qualitative ratings related to the entity, and so on.

In some implementations, to allow the client device to obtain the data for the information card, the server system (1) maps an identified key term indicated by the client device to a specific entity, (2) selects an information card template corresponding to the specific entity or a type or classification of that entity, and (3) retrieves information from a database relating to the specific entity, according to the types of information specified by the selected information card template. The server system can then send the data for the information card to the client device for display. In some implementations, this process is done in substantially real time. For example, the server system can be tuned and can cache information about various entities so that the client device can obtain and display an information card less than a threshold amount of time after detecting the user interaction (e.g., 3 seconds, 1 second, 0.5 seconds, etc.)

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by an electronic device, the method comprising:
   obtaining, by the electronic device, interface data indicating text of a user interface of the electronic device, wherein the electronic device is associated with a user that is part of an organization;
   storing, by the electronic device, a set of terms derived from a private database for the organization, the set of terms including names from the private database for entities of different entity types, wherein the entity types are associated with corresponding card templates that each specify (i) a predetermined set of multiple indicators for which values are determined based on data stored in the private database and (ii) an arrangement in which the values of the multiple indicators are to be presented in cards for entities of the corresponding entity type;
   determining, by the electronic device, that a particular term in the text of the user interface of the electronic device is included in the set of terms stored at the electronic device, wherein the particular term is a name of a particular entity for which information is stored in the private database;
   based on determining that the particular term is included in the set of terms stored at the electronic device:
      annotating, by the electronic device, the particular term to distinguish the particular term in the user interface from other terms in the user interface that are not included in the set of terms; and
      configuring the electronic device to detect and respond to interaction with the annotated term;
   after annotating the particular term and configuring the electronic device to detect and respond to interaction with the annotated term, detecting, by the electronic device, user interaction with the annotated term; and
   in response to detecting the user interaction with the annotated term, displaying, by the electronic device, a card in the user interface, the displayed card including values for each of the multiple indicators specified by the card template corresponding to the entity type of the particular entity with the values arranged as specified in the card template corresponding to the entity type of the particular entity, the values being determined using content from the private database for the organization, wherein at least one of the values indicated in the displayed card is calculated based on information about the particular entity that is stored in the private database.

2. The method of claim 1, further comprising:
identifying a user associated with the electronic device;
receiving, by the electronic device, keyword data from a server system over a communication network, the keyword data indicating a set of terms determined based at least in part on the user or organization; and
storing the keyword data at the electronic device;
wherein determining that the particular term is included in the set of terms specified by the data stored at the electronic device comprises determining that the particular term is included in the set of terms indicated by the keyword data received from the server system.

3. The method of claim 2, wherein the set of terms includes entity names extracted from the private database for the organization.

4. The method of claim 2, wherein the set of terms includes terms identified from the private database for the organization and filtered based on an identity of the user or a role of the user in the organization.

5. The method of claim 1, wherein annotating the particular term comprises altering at least one of a font, size, style, spacing, underline, color, background, highlight, or bounding shape for the particular term.

6. The method of claim 1, further comprising:
in response to detecting user interaction with the annotated term, generating, by the electronic device, a request that indicates the particular term;
transmitting the request from the electronic device to a server system over a communication network; and
receiving, from the server system over the communication network, data provided by the server system in response to the request, wherein the data includes values, retrieved from or generated using data retrieved from the private database for the organization, for the types of data specified by the card template corresponding to the entity type of the entity;
wherein displaying the card comprises displaying, in the card, the values provided by the server system that were retrieved from or generated using data retrieved from the private database for the organization.

7. The method of claim 1, wherein providing the card for display comprises causing the card to be displayed overlaying a portion of the user interface.

8. The method of claim 1, wherein the user interface of the electronic device is a user interface of an application executing on the electronic device; and
wherein the obtaining, determining, detecting, annotating, and providing are performed using a software agent executing on the electronic device.

9. The method of claim 8, wherein the application is a web browser, and wherein the software agent is a browser extension module for the web browser.

10. The method of claim 1, wherein the set of terms comprises terms that respectively represent entities of different entity types, wherein a different information card template is defined for each of the different entity types, the information card templates each indicating a set of information to be included in information cards for entities of the corresponding entity type;
wherein the particular term represents a particular entity of a particular entity type from among the different entity types; and
wherein providing the card for display in the user interface comprises providing an information card generated based on the information card template for the particular entity type.

11. The method of claim 1, wherein obtaining the interface data comprises obtaining, by a software agent of the electronic device, interface data comprising text of a web page or web application presented by a user interface of a web browser, wherein the web page or web application includes the particular term and does not designate the particular term to be interactive; and
wherein annotating the particular term comprises designating the particular term in the web page or web application as an interactive region of the user interface of the web browser, wherein an appearance of the annotated term is different from an appearance that the web page or web application specifies for the annotated term.

12. The method of claim 1, wherein annotating the particular term comprises:
before the user interaction with the annotated term, providing the annotation as an overlay on, around, or over a region of the user interface where the particular term occurs.

13. The method of claim 1, wherein the particular term is a proper name for a specific person, business, location, or object.

14. The method of claim 1, wherein the entity is a person or business, and wherein the card includes information indicating a relationship of the organization with the person or business.

15. The method of claim 1, wherein at least one of the values displayed in the card (i) is calculated based on information about the particular entity that is stored in the private database and (ii) is a numerical value calculated at least in part based on aggregating data about the particular entity from the private database.

16. The method of claim 1, comprising selecting, for the particular entity, an information card template from among multiple different information card templates that are defined for different entity types representing categories of entities having different relationships with the organization, the information card templates each indicating a set of indicators to be included in information cards for entities of the corresponding entity type that have the corresponding relationship with the organization; and
wherein providing the card for display in the user interface comprises providing an information card generated based on the selected card template, the indicators related to the entity comprise providing one or more numerical values, calculated based on data in the private database, that quantify an aspect of a relationship between the entity with the organization.

17. An electronic device comprising:
one or more processors; and
one or more machine-readable media storing software including instructions that, when executed by the one or more processors, cause the electronic device to perform operations comprising:
obtaining, by the electronic device, interface data indicating text of a user interface of the electronic device, wherein the electronic device is associated with a user that is part of an organization;
storing, by the electronic device, a set of terms derived from a private database for the organization, the set of terms including names from the private database for entities of different entity types, wherein the entity types are associated with corresponding card templates that each specify (i) a predetermined set of multiple indicators for which values are determined based on data stored in the private database and (ii) an arrangement in which the values of the multiple indicators are to be presented in cards for entities of the corresponding entity type;

determining, by the electronic device, that a particular term in the text of the user interface of the electronic device is included in the set of terms stored at the electronic device, wherein the particular term is a name of a particular entity for which information is stored in the private database;

based on determining that the particular term is included in the set of terms stored at the electronic device:
  annotating, by the electronic device, the particular term to distinguish the particular term in the user interface from other terms in the user interface that are not included in the set of terms; and
  configuring the electronic device to detect and respond to interaction with the annotated term;

after annotating the particular term and configuring the electronic device to detect and respond to interaction with the annotated term, detecting, by the electronic device, user interaction with the annotated term; and in response to detecting the user interaction with the annotated term, displaying, by the electronic device, a card in the user interface, the displayed card including values for each of the multiple indicators specified by the card template corresponding to the entity type of the particular entity with the values arranged as specified in the card template corresponding to the entity type of the particular entity, the values being determined using content from the private database for the organization, wherein at least one of the values indicated in the displayed card is calculated based on information about the particular entity that is stored in the private database.

18. The electronic device of claim 17, wherein the operations further comprise:
  identifying a user associated with the electronic device;
  receiving, by the electronic device, keyword data from a server system over a communication network, the keyword data indicating a set of terms determined based at least in part on the user or organization; and
  storing the keyword data at the electronic device;
  wherein determining that the particular term is included in the set of terms specified by the data stored at the electronic device comprises determining that the particular term is included in the set of terms indicated by the keyword data received from the server system.

19. The electronic device of claim 18, wherein the set of terms includes entity names extracted from the private database for the organization.

20. One or more non-transitory machine-readable media storing instructions that, when executed by one or more processors of an electronic device, cause the electronic device to perform operations comprising:
  obtaining, by the electronic device, interface data indicating text of a user interface of the electronic device, wherein the electronic device is associated with a user that is part of an organization;
  storing, by the electronic device, a set of terms derived from a private database for the organization, the set of terms including names from the private database for entities of different entity types, wherein the entity types are associated with corresponding card templates that each specify (i) a predetermined set of multiple indicators for which values are determined based on data stored in the private database and (ii) an arrangement in which the values of the multiple indicators are to be presented in cards for entities of the corresponding entity type;
  determining, by the electronic device, that a particular term in the text of the user interface of the electronic device is included in the set of terms stored at the electronic device, wherein the particular term is a name of a particular entity for which information is stored in the private database;
  based on determining that the particular term is included in the set of terms stored at the electronic device:
    annotating, by the electronic device, the particular term to distinguish the particular term in the user interface from other terms in the user interface that are not included in the set of terms; and
    configuring the electronic device to detect and respond to interaction with the annotated term;
  after annotating the particular term and configuring the electronic device to detect and respond to interaction with the annotated term, detecting, by the electronic device, user interaction with the annotated term; and
  in response to detecting the user interaction with the annotated term, displaying, by the electronic device, a card in the user interface, the displayed card including values for each of the multiple indicators specified by the card template corresponding to the entity type of the particular entity with the values arranged as specified in the card template corresponding to the entity type of the particular entity, the values being determined using content from the private database for the organization, wherein at least one of the values indicated in the displayed card is calculated based on information about the particular entity that is stored in the private database.

* * * * *